G. H. SETHMAN.
METHOD OF ELECTRIC WELDING.
APPLICATION FILED APR. 13, 1922.
1,433,853.
Patented Oct. 31, 1922.
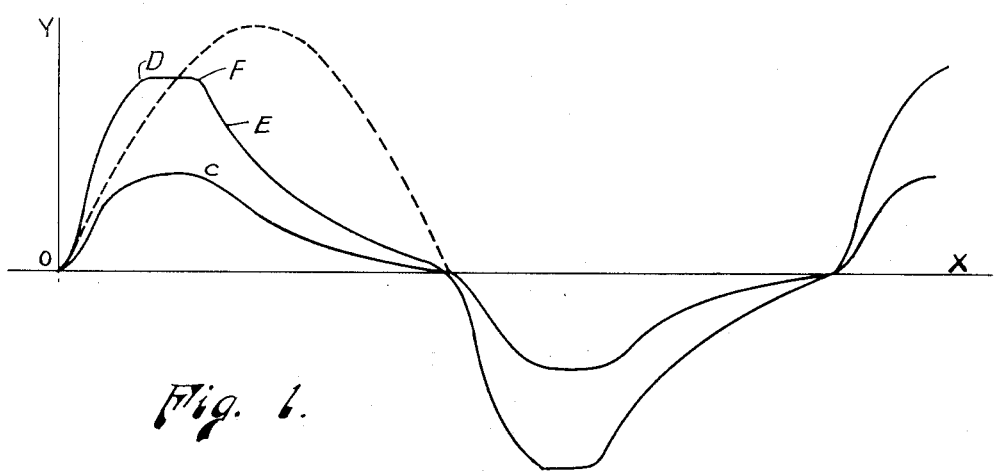
Fig. 1.
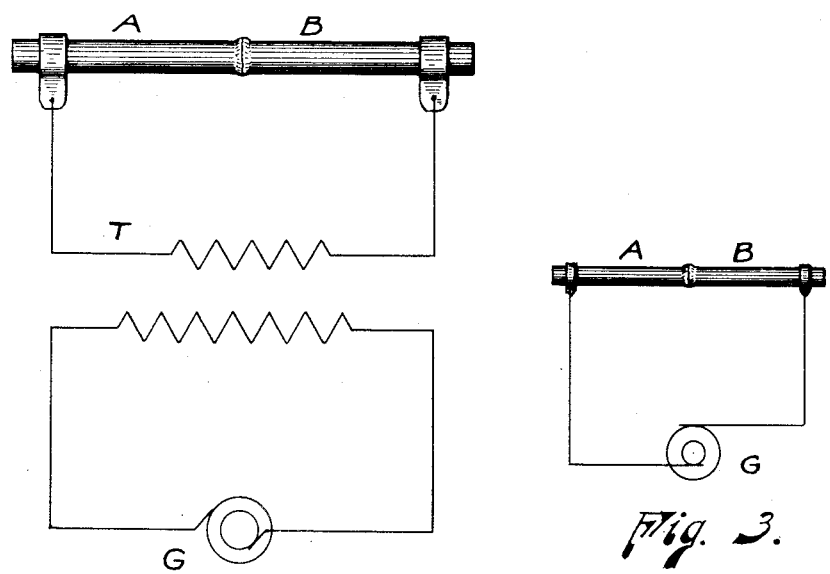
Fig. 2.
Fig. 3.
Inventor
George H. Sethman.
By
Attorney Patented Oct. 31, 1922.

1,433,853

UNITED STATES PATENT OFFICE.

GEORGE H. SETHMAN, OF DENVER, COLORADO, ASSIGNOR OF ONE-HALF TO CHARLES W. THURINGER, OF DENVER, COLORADO.

METHOD FOR ELECTRIC WELDING.

Application filed April 13, 1922. Serial No. 552,079.

*To all whom it may concern:*

Be it known that I, GEORGE H. SETHMAN, a citizen of the United States of America, residing at 647 Williams Street, in the city and county of Denver and State of Colorado, have invented certain new and useful Improvements in Methods for Electric Welding; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to electric welding and has reference to a method which will permit a simple form of apparatus to be employed for this purpose.

Electric welding in all its forms is well known and extensively employed; in the present methods, however, provisions must be taken to guard against the excessively large currents that are drawn from the source of supply when paths of very low resistance are formed by the material to be welded. In order to guard against the destructive effect of the excessive currents, generators have been employed which have a falling potential characteristic secured sometimes by a differential (compound) field winding and at other times by regulators of various sorts, all of which entails a high first cost for the machinery and renders the apparatus complicated.

I have found that the process of electric welding can be carried out by a greatly simplified apparatus if an alternating current having a flat top expanding wave form of potential and current is employed instead of the usual sine wave or direct current. The particular wave form of current employed by me is generated by a machine which is so designed that at no time after the first part of the voltage and current waves are produced is there any dynamic action between the field and the armature. I have found that in a circuit supplied with current by such a generator extreme variations in the resistance and even dead short circuits can take place without the production of excessively large currents which injure the generator, blow fuses, open circuit breakers, throw off the belts of belted units and distress the prime movers. By the employment, as the source of current, of a generator of the type pointed out above I have found that electric welding can be performed without the necessity of employing regulators of any sort as such generator cannot be injured even when the terminals of the armature coils are directly connected.

My welding process distinguishes from other processes by the character of the current employed which greatly simplifies the apparatus to be employed and enables the welding to be done at less expense and without danger of subjecting the material to excessive temperatures that will destroy or dangerously alter the physical characteristics of the material operated upon.

In order to more clearly describe my invention I shall have reference to the accompanying drawing in which:

Fig. 1 is a diagram showing the characteristic voltage and current wave produced by the generator which I employ in my welding process.

Fig. 2 is a diagram of electrical connections employed in welding when a transformer is employed and Fig. 3 shows the manner in which the generator may be directly connected to the pieces to be welded.

In Fig. 1 O—X represents the abscissa and O—Y the ordinate axis with respect to which I have plotted the potential curve E and the current curve C which have the characteristics which I consider as essential to the most satisfactory welding operation. Considering O as the point of origin curve E extends upwardly in a direction which corresponds somewhat to that which would be followed by an ordinary sine curve until the point D is reached when it becomes parallel to the longitudinal axis O—X, for a short time, until the point F is reached. At F all dynamic action between the armature and the fields of the generator ceases and the voltage curve extends downwardly to the axis on a line that corresponds to a logarithmic curve. The current curve C follows the general shape of the voltage curve E and attains its zero value at the same instant as the voltage curve. In case of a low external resistance or a dead short circuit no serious damage can result to a generator producing a potential curve of the shape above described for the reason that during that portion of the curve between O and D the value of the current is limited by the counter electromotive force of self induction while after the point F is passed the electromotive force is merely that which is due to the inductive kick or stored energy of the windings. In carrying out my process of electric welding I employ a dynamo G which generates a current having the above described wave form. When very heavy currents are desired I may connect the generator by means of a transformer T to the bars A and B, which I desire to unite by welding. No current regulators or protective devices are needed or used as the generator will not deliver an excessive current and therefore there can be no danger of damaging the generator, transformer or the articles to be welded. It is not necessary to employ a transformer as indicated in Fig. 2 for the generator can be connected directly to the pieces A and B to be welded in the manner indicated in Fig. 3.

By the use of a generator giving the above described wave form I find that better and more uniform welds can be obtained as the current is more constant and all danger of burning the metal is removed. My improved method is especially well adapted for arc welding of railway joints as the welding generator can be run directly from the trolley by means of a motor and the current from the generator employed for the welding without the interposition of resistance or other current limiting means, which results in a more economical method, and produces better results, than when a direct or alternating current source controlled by means of resistance is used.

Having now described my invention what I claim as new is:

1. The method of welding by means of electricity which consists in attaching one of the two parts to be united to the opposite poles of an alternating current supply whose potential wave form is such that its front face is substantially sinusoidal, whose top is substantially flat and whose rear face is substantially a logarithmic curve.

2. The method of uniting two opposed metallic members by means of heat developed by an electric current which consists in electrically connecting one member to each of the opposite poles of an alternating source of electric current whose potential wave form is such that its front face is substantially sinusoidal, whose top is flat and whose rear face is substantially a logarithmic curve.

In testimony whereof I affix my signature.

GEORGE H. SETHMAN.